United States Patent
Iizumi et al.

(10) Patent No.: US 9,618,703 B2
(45) Date of Patent: Apr. 11, 2017

(54) CONNECTOR HOUSING FOR SECURING AN OPTICAL CABLE AND METHODS OF USE AND MANUFACTURE THEREOF

(71) Applicant: SENKO ADVANCED COMPONENTS, INC., Marlboro, MA (US)

(72) Inventors: Kenji Iizumi, Kowloon (HK); Kim Man Wong, Tuen Mun (HK)

(73) Assignee: Senko Advanced Components, Inc., Marlborough, MA (US)

( * ) Notice: Subject to any disclaimer, the term of this patent is extended or adjusted under 35 U.S.C. 154(b) by 372 days.

(21) Appl. No.: 14/045,787

(22) Filed: Oct. 3, 2013

(65) Prior Publication Data

US 2015/0098681 A1    Apr. 9, 2015

(51) Int. Cl.
   *G02B 6/38*   (2006.01)

(52) U.S. Cl.
   CPC ......... *G02B 6/3857* (2013.01); *G02B 6/3887* (2013.01); *G02B 6/3898* (2013.01); *Y10T 29/49826* (2015.01); *Y10T 29/49954* (2015.01)

(58) Field of Classification Search
   CPC ..... G02B 6/381; G02B 6/3887; G02B 6/3849
   See application file for complete search history.

(56) References Cited

U.S. PATENT DOCUMENTS

| | | |
|---|---|---|
| 4,150,790 A | 4/1979 | Potter |
| 4,327,964 A | 5/1982 | Haesly et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Ryan Lepisto
*Assistant Examiner* — Erin Chiem
(74) *Attorney, Agent, or Firm* — Pepper Hamilton LLP

(57) ABSTRACT

Various connector housings for securing an optical cable, as well as methods of use and manufacture thereof are disclosed. A single-piece unitary connector housing body may include a first opening formed in a first end of the housing body, a second opening formed in a second end of the housing body, a bore through the housing body extending from the first opening to the second opening, and a back post surrounding the second opening. The first opening may be configured to receive a terminating optical cable and the second opening may be configured to receive a fiber optic cable. The back post may extend from the second opening in a longitudinal direction and may include a plurality of protrusions thereon. A length of the back post may have a concave shape.

11 Claims, 8 Drawing Sheets

(56) References Cited

U.S. PATENT DOCUMENTS

| | | | |
|---|---|---|---|
| D323,143 S | 1/1992 | Ohkura et al. |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,915,056 A * | 6/1999 | Bradley ............ G02B 6/3887 385/76 |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,817,780 B2 * | 11/2004 | Ngo ................ G02B 6/3887 385/86 |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,425 B2 * | 1/2014 | Nhep ................ G02B 6/381 385/78 |
| 8,651,749 B2 | 2/2014 | Dainese Junior et al. |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0269014 A1 * | 10/2009 | Winberg ............ G02B 6/3846 385/78 |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1072915 A2 | 1/2001 |
| EP | 1074868 A1 | 7/2001 |

(56) References Cited

FOREIGN PATENT DOCUMENTS

| | | |
|---|---|---|
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009/229545 A | 10/2009 |
| JP | 2009/276493 A | 11/2009 |
| TW | 200821653 A | 5/2008 |
| WO | WO 01/79904 A2 | 10/2001 |
| WO | WO 2004/027485 A1 | 4/2004 |
| WO | WO 2008/112986 A1 | 9/2008 |
| WO | WO 2009/135787 A1 | 11/2009 |
| WO | WO 2010/024851 A2 | 3/2010 |
| WO | WO 2012/136702 A1 | 10/2012 |
| WO | WO 2012/162385 A1 | 11/2012 |
| WO | WO 2013/052070 A1 | 4/2013 |
| WO | WO 2014/028527 A2 | 2/2014 |
| WO | WO 2014/182351 A1 | 11/2014 |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid% 3D8DBC7DE2EB72D315% 26binarytype% 3D48403DAA363AEB7E&ei=ZvcvTujWH4ntrAfH-dXZCg&usg=AFQjCNE1MdC-4avewRJU6IDVc_WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, vvww.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

\* cited by examiner

US 9,618,703 B2

CONNECTOR HOUSING FOR SECURING AN OPTICAL CABLE AND METHODS OF USE AND MANUFACTURE THEREOF

BACKGROUND

Traditionally, devices and components commonly used to connect optical cables, such as, for example, a Lucent Connector (LC) or a Subscriber Connector (SC), are made of a metal or a metallic compound, such as brass. This has been the desired material because the metal is strong enough to withstand a high pressing force during a crimping process. In addition, the metal is suitable for clipping reinforcement fibers, such as para-aramid synthetic fibers and the like, from an optical cable with a crimp sleeve. However, affixing the metal to a plastic connector housing may raise complications due to susceptibility of the plastic connector housing not fitting and/or breaking during the crimping process.

Previous attempts to solve this issue have included overmolding the plastic part with the metal part. Other previous attempts to solve this issue included forming a back post portion of the connector housing with a metal or metallic compound instead of plastic. Another previous attempt included constructing a back post that is integrated as a single piece with the plastic connector housing. However, these attempts are costly, require a high standard of quality control, and still result in the connector housing not fitting and/or breaking during the crimping process.

SUMMARY

In an embodiment, a single-piece unitary connector housing body may include a first opening formed in a first end of the housing body, a second opening formed in a second end of the housing body, a bore through the housing body extending from the first opening to the second opening, and a back post surrounding the second opening. The first opening may be configured to receive a terminating optical cable and the second opening may be configured to receive a fiber optic cable. The back post may extend from the second opening in a longitudinal direction and may include a plurality of protrusions thereon. A length of the back post may have a concave shape.

In an embodiment, a method of forming a connector housing may include providing a single-piece unitary housing body, forming a first opening in a first end of the housing body, forming a second opening in a second end of the housing body, forming a bore through the housing body extending from the first opening to the second opening, and forming a back post surrounding the second opening. The back post may extend in a longitudinal direction from the second opening such that a length of the back post has a concave shape and a plurality of protrusions thereon.

In an embodiment, a method of securing a terminating optical cable to a fiber optic cable may include providing a connector housing body. The connector housing body may include a first opening formed in a first end of the housing body, a second opening formed in a second end of the housing body, a bore through the housing body extending from the first opening to the second opening, and a back post surrounding the second opening. The back post may extend from the second opening in a longitudinal direction and may include a plurality of protrusions thereon. A length of the back post may have a concave shape. The method may further include attaching a terminating optical cable to the first opening, placing a fiber optic cable adjacent to the back post such that an optical fiber portion of the fiber optic cable is inserted in the second opening and a jacket portion of the fiber optic cable contacts an end portion of the back post, placing at least one reinforcement fiber such that the reinforcement fiber extends over at least a portion of the jacket portion of the fiber optic cable and the back post, placing a crimp sleeve around the reinforcement fiber, the jacket portion of the fiber optic cable, and the back post, and applying a crimping pressure to the crimp sleeve such that the crimp sleeve and the reinforcement fiber are affixed to the back post and the fiber optic cable, thereby securing the fiber optic cable to the housing body. The concave shape of the back post may prevent removal of the fiber optic cable from the housing body.

DETAILED DESCRIPTION

Figure 1:
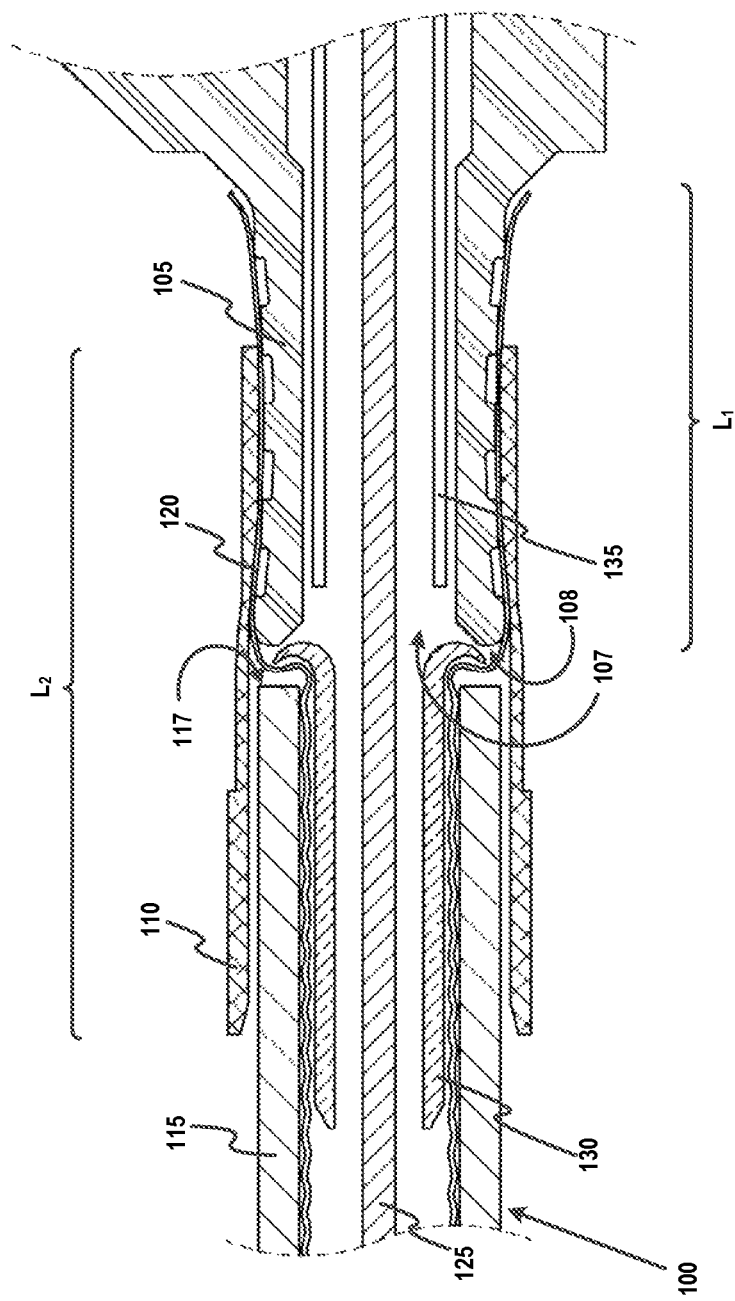
FIG. 1 depicts a cross-sectional view of a crimped optical cable according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A fiber optic connector, as used herein, refers to a device and/or components thereof that connects a first fiber optic module or cable to a second fiber optic module or cable. The fiber optic connector may be any suitable type now known or later developed, such as, for example, a ferrule connector (FC), a fiber distributed data interface (FDDI) connector, an LC connector, a mechanical transfer (MT) connector, an SC connector, an SC duplex connector, or a straight tip (ST) connector. The fiber optic connector may generally be defined by a connector housing body, and may generally be a single-piece unitary housing. In some embodiments, the housing body may incorporate all of the components described herein, except for the back post, which may be a separate component that is affixed to the connector housing body.

A back post, as used herein, refers to a device that is used to connect a fiber optic cable to the connector housing. The back post can be a separate component from the connector housing body, or can be an integrated component of the connector housing body. The back post can have a plurality of protrusions thereon to provide additional crimping security. The back post has a length that extends from the connector housing body that is generally concave shaped so that, when a crimp sleeve is crimped over the back post, it provides a secure connection for the crimp sleeve without causing any damage to the back post.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

In the various embodiments described herein, a connector housing may generally be a single-piece unitary body for connecting two fiber optic cables together. The housing body of the connector may have a first opening, a second opening, and a bore through the body that connects the two openings. A back post may surround the second opening. The back post may have a plurality of protrusions thereon and may have a length with a substantially concave shape. Such a concave shape may generally allow for crimping pressure to be applied at or near a center portion of the back post such that the crimped fiber optic cable is secured and retentively engaged and will not break free from the connector, thereby increasing the pulling strength on the cable. The concave shape may also allow for crimping in a center portion of the back post without damaging the connector housing because less pressure is necessary to adequately crimp the crimp sleeve. This also forms a tapered shape crimp sleeve, which reinforces the security of the crimped fiber optic cable to the connector housing.

FIG. 1 depicts a cross-sectional view of a crimped optical cable according to an embodiment. The optical cable, generally designated 100, may have one or more optical fibers 125 and a jacket portion 115. In various embodiments, the optical cable 100 may extend from one or more optical devices to the connector, as described in greater detail herein.

In some embodiments, each of the one or more optical fibers 125 may be a monofilament optical fiber. In other embodiments, the one or more optical fibers 125 may be a plurality of optical fiber strands that are arranged together. Each of the one or more optical fibers 125 may have a transparent core, which transmits an optical signal. In addition, each of the one or more optical fibers 125 may have a transparent cladding around the core. The core and the cladding of each of the one or more optical fibers 125 may be made of glass or a polymeric material. In some embodiments, the glass optical fibers 125 may be made of silica. In other embodiments, the glass optical fibers 125 may contain other materials, such as, for example, fluorozirconate glasses, fluoroaluminate glasses, chalcogenide glasses, and crystalline materials such as sapphire. Glass that is silica- and fluoride-based may have a refractive index of about 1.5, and glass that is chalcogenide-based may have a refractive index of up to about 3. The index difference between the core and the cladding may be less than about one percent. Optical fibers made of a polymeric material may include step-index multi-mode fibers having a core with a diameter of about 0.5 millimeters or larger. Such polymeric fibers may have higher attenuation coefficients than glass fibers, such as, for example, about 1 dB/m or higher. Thus, the high attenuation may limit the range of polymeric optical fiber-based systems. In some embodiments, each optical fiber 125 may have a diameter of about 245 µm to about 1000 µm, including about 245 µm, about 250 µm, about 300 µm, about 325 µm, about 400 µm, about 450 µm, about 475 µm, about 500 µm, about 550 µm, about 600 µm, about 700 µm, about 800 µm, about 900 µm, about 950 µm, about 1000 µm, or any value or range between any two of these values (including endpoints).

The optical cable 100 may be subjected to various tensile loads during manufacture, handling, installation, and in some cases, the service life of the optical cable. For example, the cable is sometimes subjected to substantial pulling forces when being installed from towers or in ducts. Further, the cable is subject to tensile loads as a result of the cable itself and due to atmospheric conditions such as, for example, wind and ice. Thus, the jacket portion 115 may generally serve to provide a protective covering for the one or more optical fibers 125. On at least one end of the optical cable 100, the jacket 115 may generally terminate at a distance that is shorter than the one or more optical fibers 125 such that the optical fibers can be inserted into a back post 105, as described in greater detail herein. The jacket 115 may be made of any material suitable for optical cables, such as, for example, low smoke free of halogen (LSFH) polymer, polyvinyl chloride (PVC), polyethylene (PE), polyurethane (PUR), polybutylene terephthalate (PBT), or polyamide (PA). The jacket 115 may contain one or more structural elements, such as, for example, reinforcement fibers 120 and/or a cable eyelet 130. The various structural elements may provide additional protection for the one or more optical fibers 125, act to separate various elements, provide additional pulling strength on the optical cable 100, assist in prevention of removal of the optical cable from the back post 105, provide a flexibility for the optical cable, retentively engage the optical cable with the back post, and/or the like.

The reinforcement fiber 120 may generally be used to provide reinforcement to the optical fibers 125 and/or to provide retentive engagement of the optical cable 100 to the back post 105. In some embodiments, the reinforcement fibers 120 may be metallic, such as, for example, aluminum or steel. In other embodiments, the reinforcement fibers 120 may be non-metallic, such as, for example, S-glass fibers, aramid fibers, other synthetic fibers, and/or carbon fibers. In some embodiments, the reinforcement fibers 120 may be located between the jacket 115 and the optical fibers 125. In some embodiments, the reinforcement fibers 120 may be removably incorporated with the jacket 115. In some embodiments, the reinforcement fibers 120 may be located on an outside surface of the jacket 115. The reinforcement fibers 120 may have a strand-like structure or may have a mesh-like structure that surrounds an entire surface of the optical fibers 125. Similar to the optical fibers 125, the reinforcement fibers 120 may extend a distance beyond the jacket 115 such that the reinforcement fibers 120 can be placed over or on the back post 105, as described in greater detail herein. In some embodiments, the reinforcement fibers 120 may be clippable after a crimping pressure has been applied to a crimp sleeve 110 surrounding the reinforcement fibers, as described in greater detail herein.

In various embodiments, the cable eyelet 130 may separate the optical fibers 125 from the reinforcement fibers 120 in the optical cable 100. In some embodiments, the cable eyelet 130 may be positioned underneath the jacket 115 and the reinforcement fibers 120. In some embodiments, the cable eyelet 130 may act as a support to counteract the pressure applied to the crimp sleeve 110 during a crimping process. Thus, after the crimping process, the jacket 115 and the reinforcement fibers 120 layer may be affixed between the crimp sleeve 110 and the cable eyelet 130. The cable eyelet 130 may be made of a material that is relatively harder than the crimp sleeve 110 such that the crimp sleeve can be deformed by crimping while the cable eyelet withstands the crimping pressure such the jacket 115 and reinforcement fibers 120 can be securely clipped between them. In some embodiments, the cable eyelet 130 may be an optional component, particularly in embodiments where the crimping process does not require a large crimping pressure to crimp the crimp sleeve 110. In other embodiments, the cable eyelet 130 may be omitted where the crimp sleeve 110 is capable of holding the optical cable 100 on its own.

When the optical cable 100 is connected to the back post 105, the optical fibers 125 may be inserted in an opening 107 in the back post. An optional ferrule flange tube 135 may guide the optical fibers 125 through the opening 107 in the back post 105 so that they contact other optical fibers, as described in greater detail herein. The optical fibers 125 may be contacted with another optical fiber and/or other functional components such as, for example, a terminator, an attenuator and/or the like via one or more ferrules having optical connectors in varying standard interfaces. An end 117 portion of the jacket 115 may contact an end portion 108 of the back post 105 such that the optical fibers 125 extend sufficiently into the back post and/or various portions of the connector body without being hindered by the jacket. Similarly, the end portion 117 of the jacket 115 may contact the end portion 108 of the back post 105 such that the reinforcement fibers 120 extend over at least a portion of the back post. For example, the reinforcement fibers 120 may extend over a length $L_1$ of the back post 105, about ¾ of the length, about ⅔ of the length, about ½ of the length, about ⅓ of the length, about ¼ of the length, about ⅛ of the length, or any value or range between any two of these values (including endpoints).

In various embodiments, a crimp sleeve 110 may have first and second open ends and may define a passage between the first and second open ends. The crimp sleeve 110 may be positioned such that at least a portion of the optical cable 100 and/or at least a portion the back post 105 passes through the first and/or second open ends. Thus, the crimp sleeve 110 may surround at least a portion of the optical cable 100 and/or at least a portion of the back post 105. In some embodiments, the crimp sleeve 110 may be positioned surrounding the length $L_1$ of the back post 105 such that, when crimped, the crimp sleeve retentively engages the optical cable 100 to the back post 105. For example, the crimp sleeve 110 may extend over the entire length $L_1$, about ¾ of the length, about ⅔ of the length, about ½ of the length, about ⅓ of the length, about ¼ of the length, about ⅛ of the length, or any value or range between any two of these values (including endpoints). In some embodiments, about half of the length of the crimp sleeve 110 may cover a portion of optical cable 100 with the jacket 115 from the jacket end region 117. In some embodiments, about half length of the length of the crimp sleeve 110 may cover the back post 105. In some embodiments, the crimp sleeve 110 may be affixed to the back post 105 prior to connection with to the optical cable 100 with the jacket 115. The crimp sleeve 110 may have a length $L_2$ that is suitable for the crimp sleeve to surround at least a portion of the optical cable 100 and/or at least a portion of the back post 105. Those with ordinary skill in the art will recognize that the length $L_2$ of the crimp sleeve 110 can be used without departing from the scope of this disclosure. Illustrative crimp sleeve lengths may include, for example, about 2.0 mm to about 20 mm, including about 2.0 mm, about 2.5 mm, about 3.0 mm, about 3.5 mm, about 4.0 mm, about 5.0 mm, about 10 mm, about 15 mm, about 20 mm, or any value or range between any two of these values (including endpoints). In some embodiments, the crimp sleeve 110 may generally have a length $L_2$ that is sufficient to cover at least a portion of the back post 105 and at least a portion of the jacket 115. In addition, the crimp sleeve 110 may generally have a diameter that exceeds that of an outer diameter of the optical cable 100 and/or the back post 105 such that the crimp sleeve is movable over the optical cable and/or the back post prior to a crimping pressure being applied to the crimp sleeve to retentively engage the crimp sleeve. The crimp sleeve 110 may be a crimpable component constructed of any material now known or later developed that is generally recognized as being suitable for use as a crimpable material. Illustrative materials may include malleable metals and/or the like, such as, for example, aluminum, copper, lead, or combinations thereof.

Figure 2A:
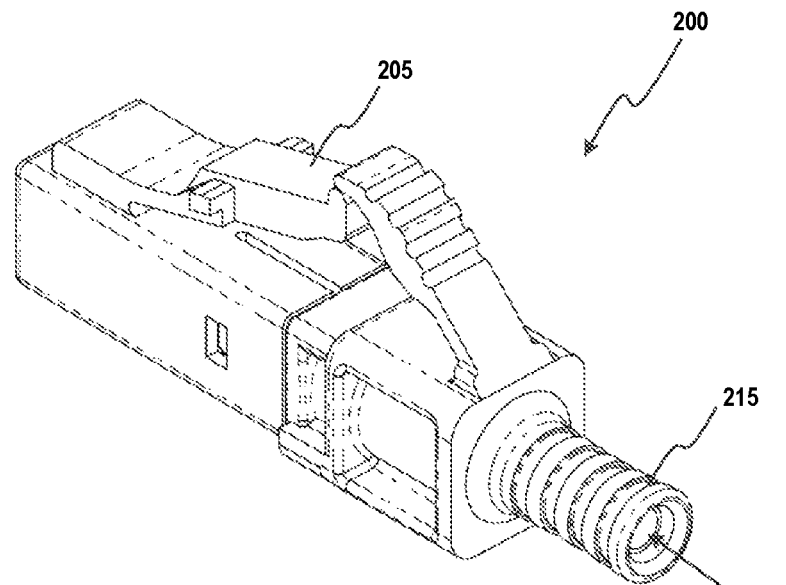
FIGS. 2A and 2B depict perspective views of a connector according to an embodiment.
Figure 2B:
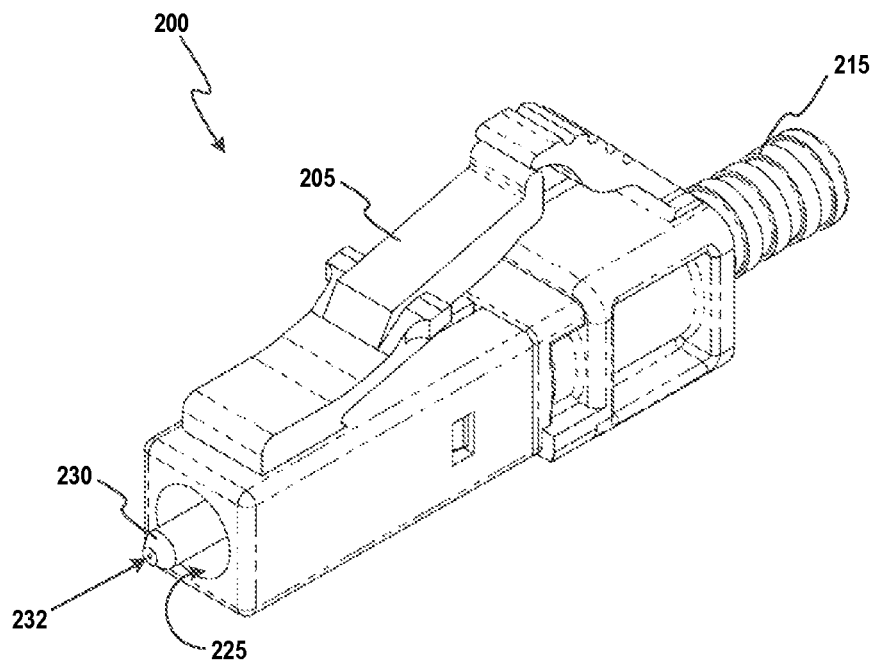

FIGS. 2A and 2B depict perspective views of a connector according to an embodiment. The connector, generally designated 200, may include a housing 205. The housing 205 may include a first opening 225, a second opening 210, a bore (not shown) through the connector that connects the first and second openings, and the back post 215 surrounding the first opening. In various embodiments, the connector 200 may be a single-piece construction. Thus, the connector 200 may be formed from a block of material along with the various components thereof. For example, the block of material may be drilled, cut, shaped, molded, injection molded, formed, and/or the like to create the various components. In another example, the connector 200 (and the various components thereof) may be formed via deposition methods such as three-dimensional (3D) printing or the like. The material may be any material, and is not limited by this disclosure. In particular embodiments, the material may be a polymeric material, particularly polymeric materials that are suited for withstanding various external forces and/or environmental conditions such as a crimping pressure or the like. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose. In some embodiments, the connector housing 205 may be formed as a single piece with the back post 215 connected to the connector housing. Thus, the back post 215 is removably attached to the connector housing 205. Alternatively, the back post 215 may be permanently affixed to the connector housing 205, albeit as a separate piece from the connector housing.

Figure 3A:
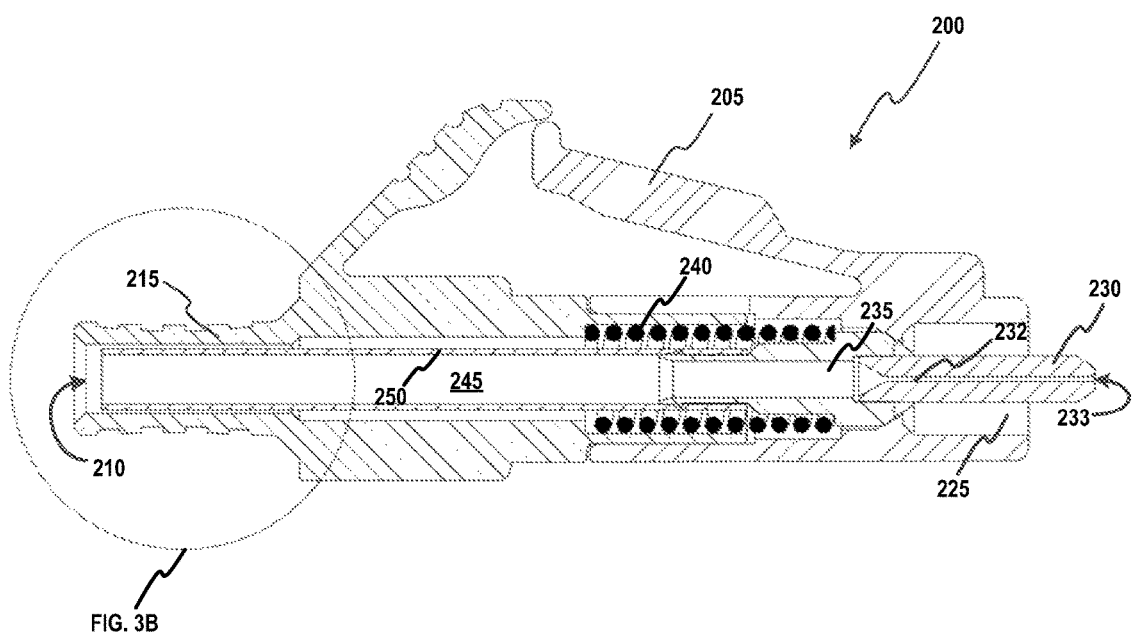
FIG. 3A depicts a cross-sectional view of a connector according to an embodiment.

FIG. 3A depicts a cross-sectional view of the connector 200. In various embodiments, the first opening 225 may be configured to receive a terminating optical cable. In some embodiments, the first opening 225 may be configured to securely receive a terminating optical cable. Accordingly, the first opening 225 may be any shape or size to accommodate any terminating optical cable. In addition, the first opening 225 may be configured to accept any type of coupling from the terminating optical cable, including, for example, screws, clips, snaps, push-pull type couplings, duplex snaps, bayonet couplings, and the like, or any combination thereof. The first opening 225 may further be configured to receive one or more optical fibers from the terminating optical cable, and in conjunction with the other various components as described herein, may provide an optical connection with the optical cable 100 (FIG. 1).

In various embodiments, the first opening 225 may be configured to retentively engage the terminating optical cable. Retentive engagement may include releasable engagement, permanent retentive engagement, and semi-permanent retentive engagement. Thus, the first opening 225 may include various components that assist in retentively engaging the terminating optical cable. Illustrative components used to retentively engage the terminating optical cable may include a screw, a clip, a snap, a push-pull type device, a bayonet, a flange 235, a retention arm, a ferrule 230, a spring 240, and/or the like. Illustrative components used to permanently and/or semi-permanently retain the terminating optical cable may include glues, adhesives, and/or the like.

In some embodiments, the first opening 225 may be sized to receive and hold a ferrule 230 in a generally longitudinal alignment with the bore 245. The ferrule 230 may have a central passageway 232 extending longitudinally fully through the ferrule. The ferrule 230 may be configured to receive the terminating optical cable such that the optical fibers from the terminating optical cable are inserted into the central passageway 232. The optical fibers may be affixed within the ferrule central passageway 232 with the optical fiber terminating at or near a forward tip 233 of the ferrule 230. An end portion of the optical fiber at the ferrule tip 233 may be polished to improve light transmission. In some embodiments, the ferrule 230 may be made of a material similar to the other components of the connector housing. In other embodiments, the ferrule 230 may be made of ceramic, metal, a polymeric material, or any other suitable material.

In various embodiments, the spring 240 may be positioned within the connector housing 205 such that it is in or around the bore 245 near the ferrule 230. In some embodiments, the spring 240 may be configured to bias the ferrule 230 in a forward direction relative to the first opening 225. Thus, the spring 240 may provide a forward biasing force on the ferrule 230 to allow the ferrule to move in a forward direction. Accordingly, this positioning may permit the tip 233 of the ferrule 230 to engage and be rearwardly displaced during insertion of a terminating optical cable.

Figure 3B:
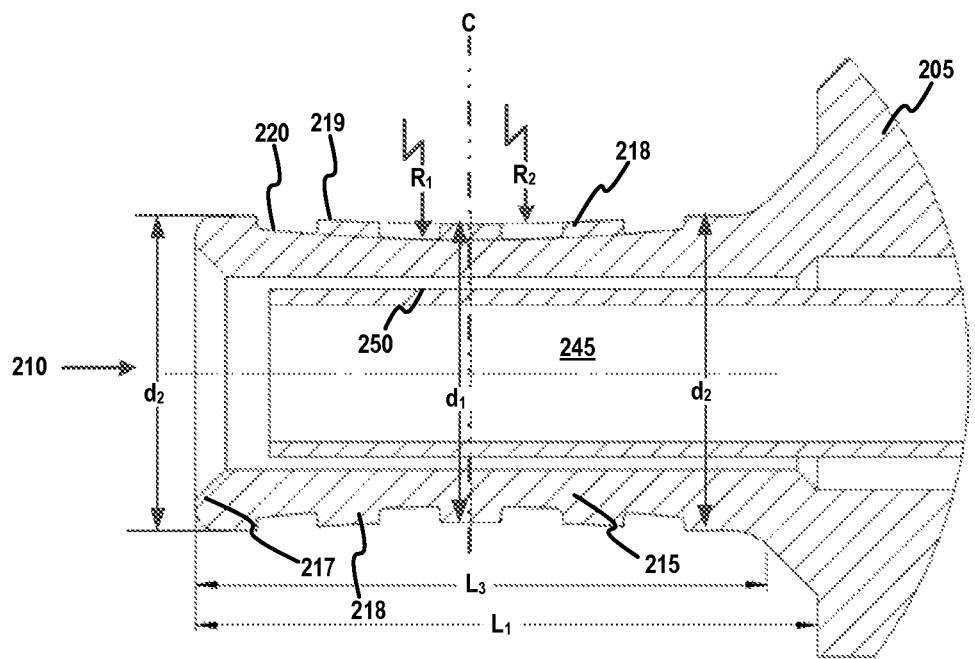
FIG. 3B depicts an exploded cross-sectional view of a back post portion of a connector according to an embodiment.

In various embodiments, the second opening 210 may be configured to receive an optical cable, as described herein. The second opening 210 may generally have a size and shape that is suitable to receive at least the one or more optical fibers, as described in greater detail herein. As shown in greater detail in FIG. 3B, the second opening 210 may generally be surrounded by the hollow back post 215 such that the second opening can be accessed via a tip portion 217 of the back post.

The back post 215, as previously described herein, may be constructed as a continuous portion of the connector housing 205 or may be constructed as a portion separate from the connector housing. When the back post 215 is separate, it may be affixed to the connector housing 205. Similar to the other components of the connector housing 205, the back post 215 may generally be constructed of a polymeric material, particularly polymeric materials that are suited for withstanding various external forces and/or environmental conditions such as a crimping pressure or the like. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose.

As previously described herein, the back post may extend in a longitudinal direction along the length $L_1$ from the connector housing 205. The length $L_1$ may generally include a total length from an extender cap or a rear face of the connector housing 205. Accordingly, the length $L_1$ includes any features of the back post 215, such as a fillet, a round, or a chamfer feature. When subtracting such features, the back post 215 may extend a length $L_3$ from the features to the tip 217 of the back post. Those having ordinary skill in the art will recognize that the back post 215 may have any length $L_1$, and thus the length is not limited by this disclosure. Illustrative lengths may include about 3.0 mm to about 8.0 mm, including about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, or any value or range between any two of these values (including endpoints). In some embodiments, the length $L_3$ may be about 2.0 mm to about 7.0 mm, including about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, or any value or range between any two of these values (including endpoints). In some embodiments, the back post 215 may have a length $L_1$ such that about half of the crimp sleeve 110 (FIG. 1) covers about ⅔ of the length of the back post, which can be illustrated by the following equation: $L_2/2=2L_1/3$.

In various embodiments, the back post 215 may have a plurality of protrusions 218 thereon. In particular embodiments, each of the plurality of protrusions 218 may form concentric rings around the back post 215. Thus, the back post 215 may have a plurality of protrusions 218 in rib-like structures. Each of the plurality of protrusions 218 may have a top surface 219 and a root surface 220. The top surface 219 of each protrusion 218 may define an outer contour of the back post 215 in a top curvature radius $R_2$. Similarly, the root surface 220 of each protrusion 218 root may define an inner contour of the back post 215 in a root curvature radius $R_1$. Each of the top curvature radius $R_2$ and the root curvature radius $R_1$ may have a radial center along axis C. Axis C may be located at a mirror line of a symmetric concave profile of the back post 215. Those with ordinary skill in the art will recognize that the protrusions 218 may be of any dimensional size and shape, and thus the size and shape is not limited by this disclosure. In some embodiments, the dimensional size of each protrusion may be limited such that a value for $R_2$ is smaller than a value for $R_1$. In some embodiments, the protrusions 218 may generally reinforce the crimp sleeve when a crimping force is applied, as described herein. In some embodiments, the protrusions 218 may provide the back post with a concave shape along the length $L_1$. Accordingly, the back post 315 may generally have a larger diameter $d_2$ at or near the tip 217, and at or near the extender cap or the rear face of the connector housing 205. In addition, the back post 315 may have a smaller diameter $d_1$ at or near a center portion such that the back post has a concave shape along its length at the crimping region. Those having ordinary skill in the art will recognize that each of the diameters $d_1$, $d_2$ may be of any size. Accordingly, the size of each diameter $d_1$, $d_2$ is not limited by this disclosure. In some embodiments, the diameters $d_1$, $d_2$ should be sufficient to provide a necessary thickness of the back post wall, a sufficient clearance, and a sufficient space for the ferrule flange tube 250 to be located freely inside the back post 215. Such a concave shape of the back post 215 may be desired because it may allow for a crimp sleeve to be securely crimped to the back post in such a manner that the fiber optic cable will be secured to the back post, thereby preventing removal of the fiber optic cable from the second opening and the back post and/or increasing a pulling strength on the fiber optic cable. The concave shape of the back post 215 may also allow the crimp sleeve to be crimped with less crimping pressure, thereby preventing or substantially reducing the possibility of damage to the back post due to excessive crimping pressure.

Referring back to FIG. 3A, in various embodiments, the bore 245 may generally be a passageway or the like through the connector housing 205 that extends from the first opening 225 to the second opening 210. The bore 245 is not limited by this disclosure, and may be any size and/or shape, particularly sizes and/or shapes that allow for passage of optical fibers through at least a portion of the connector housing 205, as described in greater detail herein. In some embodiments, the bore 245 may be lined or coated with a material so as to facilitate movement of light through the bore. In some embodiments, the bore 245 may contain the ferrule flange tube 250, which acts to guide optical fibers through the bore, as described in greater detail herein. The ferrule flange tube 250 may be constructed of or coated with various materials to facilitate movement of light through the bore 245. In some embodiments, the flange 235 may slip on the ferrule flange tube 250 such that the ferrule flange tube 250 can provide a guided passageway from the back post inlet 107 (FIG. 1) to the flange inlet for an optical fiber to pass through and enter the ferrule 230 through the bore 232. In some embodiments, the ferrule flange tube 250 may be made of a polymeric material, such as, for example, polytetrafluoroethyline.

Figure 4:
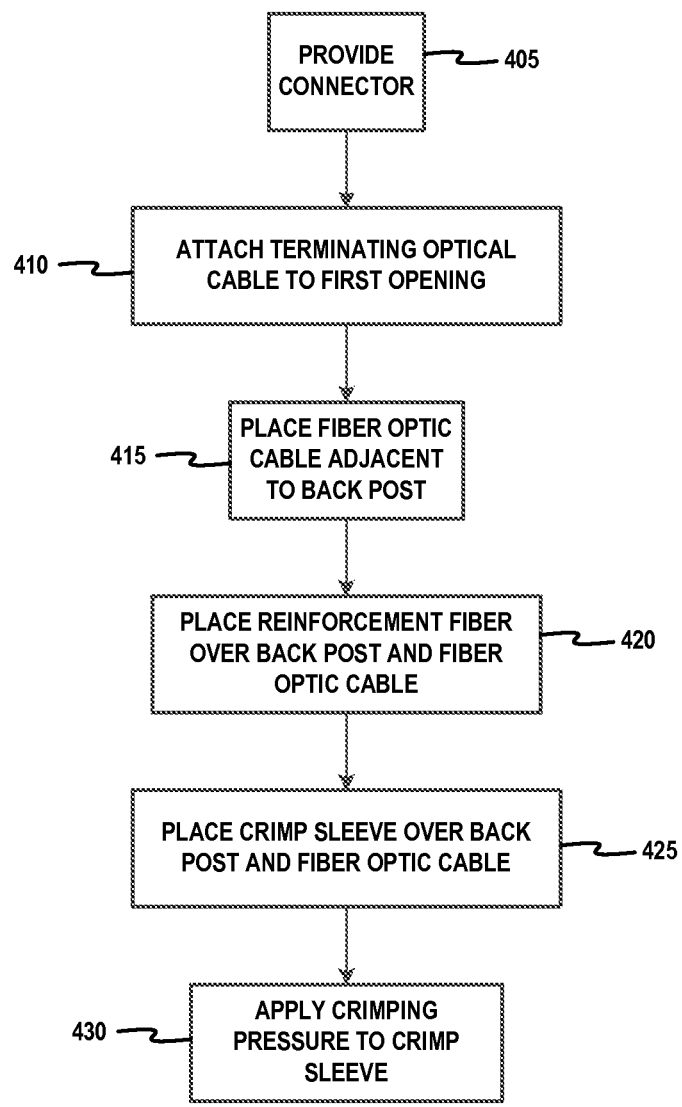
FIG. 4 depicts a flow diagram of a method of crimping with a connector according to an embodiment.

FIG. 4 depicts a flow diagram of a method of crimping according to an embodiment. In various embodiments, the connector may be provided 405. The connector, as previously described herein, may have a housing body having at least a first opening formed in a first end, a second opening formed in a second end, a bore through the housing extending from the first opening to the second opening, and a back post surrounding the second opening. Also, as previously described herein, the back post may extend from the second opening in a longitudinal direction. The back post may also have a plurality of protrusions thereon, and may have a concave shape along its length.

In various embodiments, a terminating optical cable may be attached 410 to the first opening. The terminating optical cable and/or portions thereof may be attached 410 by any means of attachment described herein. The terminating optical cable and/or portions thereof may be attached 410 by means of removable attachment, permanent attachment, or semi-permanent attachment. The terminating optical cable may also be attached 410 such that it is capable of sending and receiving transmissions via light waves through the connector to the fiber optic cable attached via the back post. In some embodiments, the terminating optical cable and/or portions thereof may be attached 410 such that they are in optical communication with a fiber optic cable received via the back post around the second opening. In some embodiments, the terminating optical cable and/or portions thereof may be attached 410 such that they are physically connected to a fiber optic cable received via the back post.

In various embodiments, a fiber optic cable may be placed 415 adjacent to the back post. The fiber optic cable that is placed 415 adjacent to the back post may generally be a fiber optic cable that is to be placed in optical communication with the terminating optical cable attached 410 to the first opening. The fiber optic cable may be placed 415 such that an optical fiber portion is inserted in the second opening and through at least a portion of the connector housing body. The fiber optic cable may also be placed 415 such that a jacket portion contacts and end portion of the back post. As previously described herein, the jacket may be placed surrounding the back post so that the jacket covers at least a portion of the back post.

In various embodiments, at least one reinforcement fiber may be placed 420 over the back post and the jacket portion of the fiber optic cable. The at least one reinforcement fiber may be placed 420 such that it covers at least a portion of the jacket and at least a portion of the back post.

In various embodiments, the crimp sleeve may be placed 425 around at least a portion of the reinforcement fibers, the jacket, and the back post, as previously described herein. The crimp sleeve may be placed 425 such that it may be crimped to secure the fiber optic cable to the connector housing. In some embodiments, prior to placing 415 the fiber optic cable and placing 420 the at least one reinforcement fiber, the crimp sleeve may be placed 425 by placing the crimp sleeve around the fiber optic cable and sliding the crimp sleeve over an end portion of the fiber optic cable and the back post so that it is properly positioned. In other embodiments, prior to placing 415 the fiber optic cable and placing 420 the at least one reinforcement fiber, the crimp sleeve may be placed 425 by placing the crimp sleeve around the back post and sliding the crimp sleeve over an end portion of the fiber optic cable and the back post so that it is properly positioned. In other embodiments, the crimp sleeve may be affixed to the fiber optic cable prior to placing 415 it adjacent to the back post. Accordingly, when the fiber optic cable is placed 415 adjacent to the back post, the crimp sleeve is automatically placed 425 in proper position.

A pressure may be applied 430 to the crimp sleeve to compress the crimp sleeve around the back post and/or the fiber optic cable. In some embodiments, the pressure may be a crimping pressure. As used herein, crimping pressure is broadly construed, and may include, for example, heat crimping, pressure crimping, heat and pressure crimping, ultrasonic welding, metal-to-metal welding or laser welding. In some embodiments, a crimping pressure may be applied 430 by using a die to apply pressure on a plurality of sides of the crimp sleeve, as shown in FIGS. 5A and 5B.

Figure 5A:
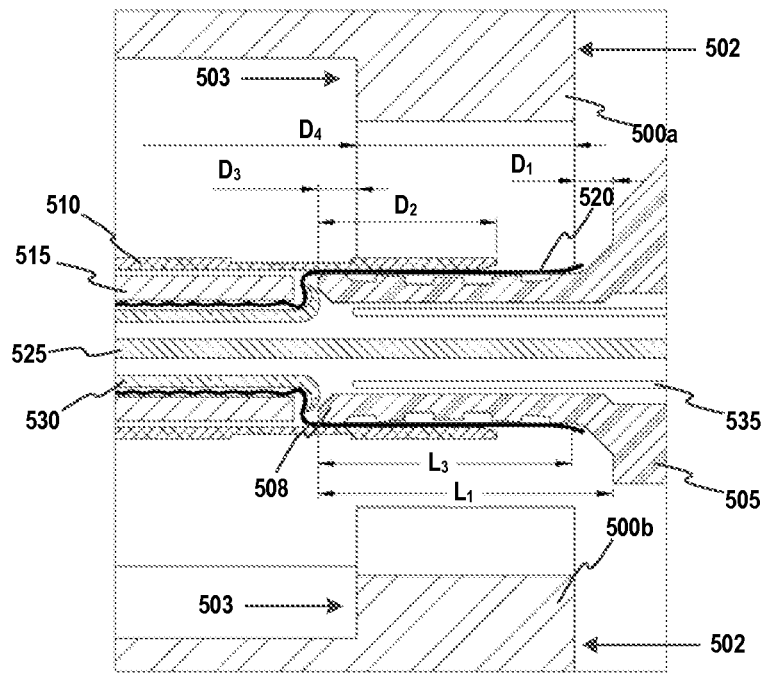
FIG. 5A depicts a cross-sectional view of an optical cable, a portion of a connector, and a crimping die prior to crimping according to an embodiment.
Figure 5B:
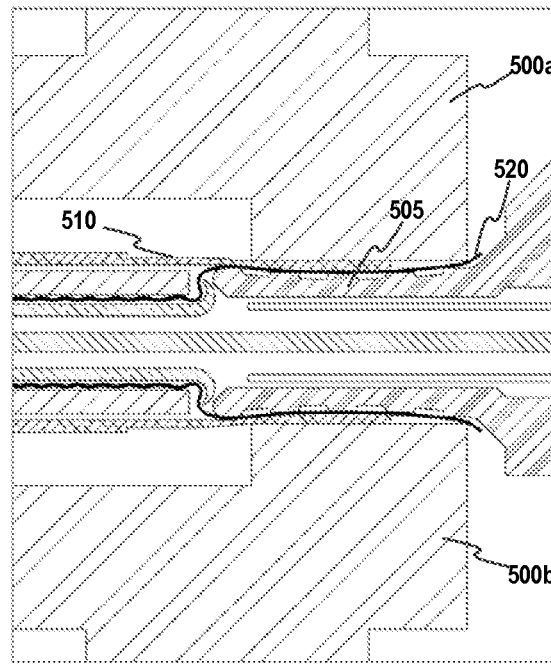
FIG. 5B depicts a cross-sectional view of an optical cable, a portion of a connector, and a crimping die during crimping according to an embodiment.

As shown in FIGS. 5A and 5B, crimping pressure may be applied 430 with a crimp die 500. The crimp die 500 may have one or more portions, such as, for example a top crimp die portion 500a and a bottom crimp die portion 500b. The crimp die portions 500a, 500b may generally sized and shaped such that they compress a portion of the crimp sleeve 510 over the back post 505, such as, for example, a center portion of the back post, as described in greater detail herein.

In various embodiments, the crimp die 500 may have a width $D_4$. In some embodiments, the width $D_4$ may correspond to an amount of the crimp sleeve 510 that is desired to be compressed. In some embodiments, the width $D_4$ may correspond to a standard width of commonly used crimp dies. Illustrative die widths $D_4$ may be about 2.0 mm to about 6.0 mm, including about 2.0 mm, about 2.5 mm, about 3.0 mm, about 3.5 mm, about 4.0 mm, about 4.5 mm, about 5.0 mm, about 5.5 mm, about 6.0 mm, or any value or range between any two of these values (including endpoints). In some embodiments, the crimp die 500 may be positioned such that, when a crimping pressure is applied to the crimp sleeve 510, a first end portion 502 of the die is a distance $D_1$ from a rear surface of the housing (such as where the housing meets the back post 505). A second end portion 503 of the die may have a distance $D_3$ from an end portion 508 of the back post 505. Accordingly, the distance $D_1$ may generally be expressed by the equation $D_1=L_1-D_4-D_3$. Thus, the distance $D_1$ may generally be the total length of the back post 505 minus the width $D_4$ of the die 500, and then minus the distance $D_3$ from end portion 508 of the back post 505 to the second end portion 503. The various distances may allow for the die 500 to provide a crimping pressure to a middle portion of the back post 505.

Figure 6:
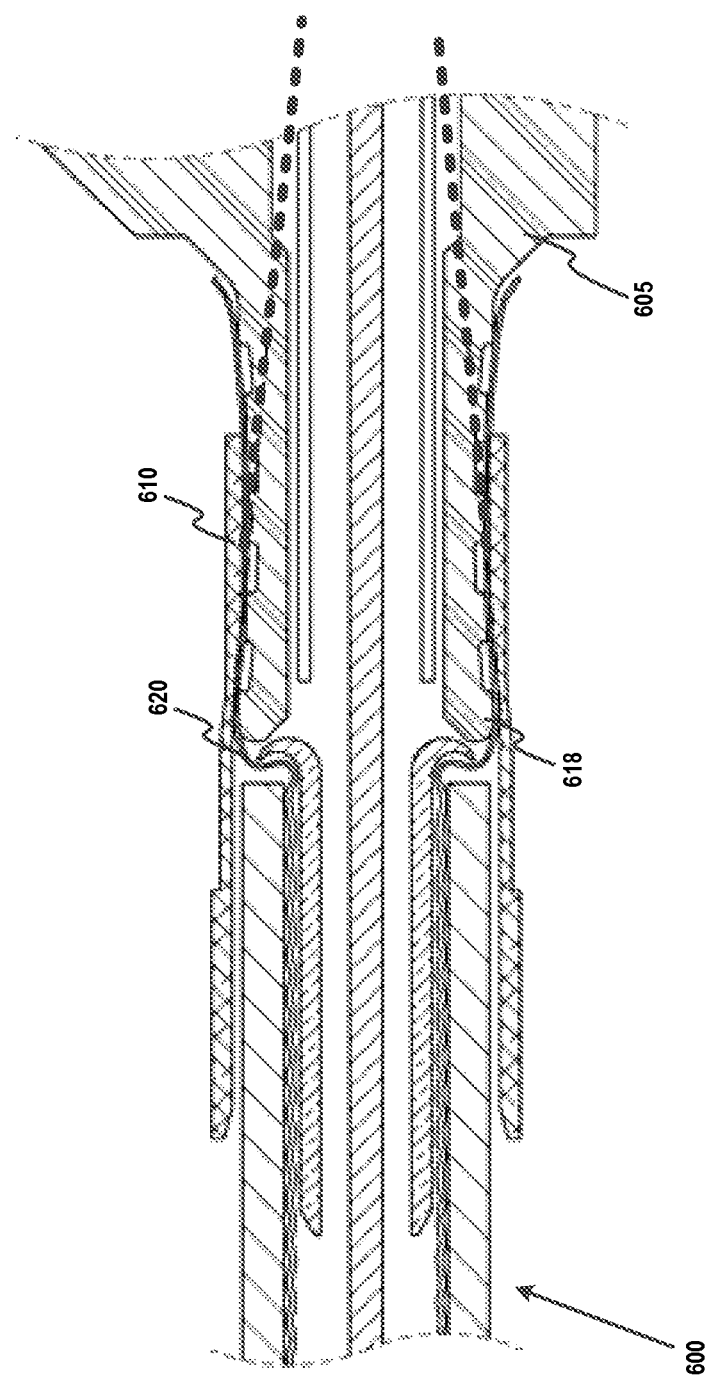
FIG. 6 depicts a cross-sectional view of the crimped optical cable to the back post according to an embodiment.

FIG. 6 depicts a cross-sectional view of the crimped optical cable 600 to the back post 605 according to an embodiment. The crimp sleeve 610 may be deformed into a tapered, curved shape after the crimping pressure has been applied, which is caused by the concave shape of the back post 605. The dotted lines represent a tangency of a tapered shape of the crimp sleeve 610 after crimping pressure has been applied. In addition, the reinforcement fibers 620 may be clipped by the protrusions 618 in the back post 605 when a crimping pressure has been applied. The clipped reinforcement fibers 620 may provide additional security to prevent removal of the optical cable from the back post 605.

Figure 7:
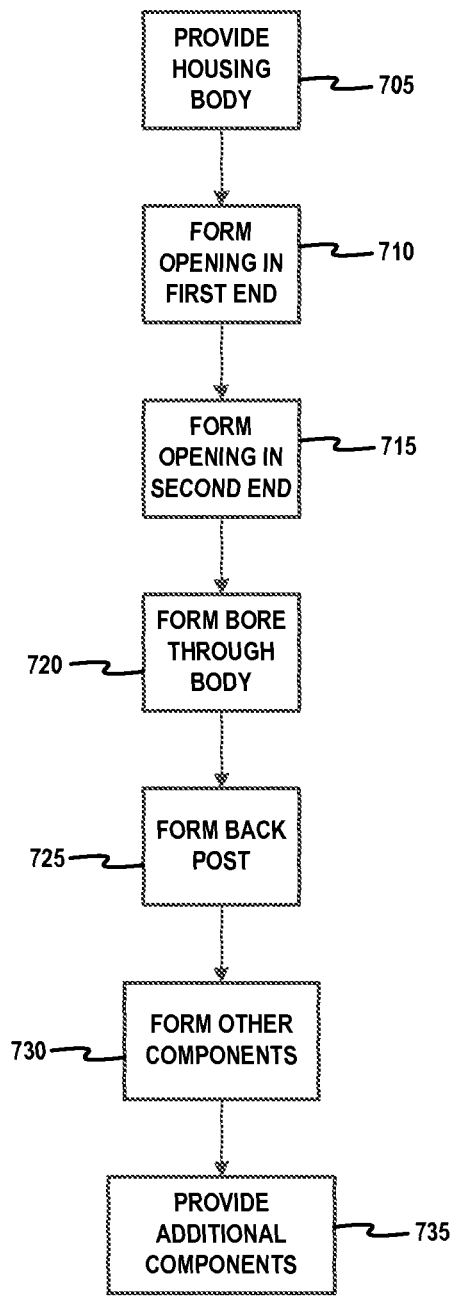
FIG. 7 depicts a flow diagram of a method of forming a connector according to an embodiment.

FIG. 7 depicts a flow diagram of a method of forming the connector housing according to an embodiment. In various embodiments, a housing body may be provided 705. As described herein, the housing body may be a single piece, unitary construction. The housing body may be provided 705 by forming the housing body via injection molding, by forming the housing body via 3D printing, or the like, as described in greater detail herein.

In various embodiments, a first opening may be formed 710 in a first end and a second opening may be formed 715 in a second end. A bore may be formed 720 through the housing body, extending from the first opening to the second opening. In some embodiments, forming 710, 715, 720 the first opening, the second opening, and the bore may be completed by removing portions of the housing body, such as by drilling through the housing body. In other embodiments, forming 710, 715, 720 the first opening, the second opening, and the bore may be completed during the process of providing 705 the housing body, such as when the housing body is formed via injection molding, 3D printing, or the like. Such embodiments may provide a method of producing the housing body with the first opening, the second opening, and the bore while decreasing the amount of scrap material produced, decreasing the cost of providing 705 the housing body, decreasing the amount of time necessary to provide the housing body, and/or the like.

In various embodiments, the back post may be formed 725. In some embodiments, the back post may be formed 725 as a portion of providing 705 the housing body and/or as a portion of forming 715 the second opening. In other embodiments, the back post may be formed 725 by affixing the back post to the housing body such that the second opening extends through the housing body and the back post. In such embodiments, the back post may be permanently affixed to the housing body by any means of fixture, such as, for example, heat fixation, welding, applying an adhesive, applying one or more attachment devices and/or the like.

In various embodiments, various other components as described herein may be formed 730. For example, a ferrule may be formed 730 within the first opening. In another example, a flange may be formed 730 on the ferrule. In some embodiments, the various other components may be formed 730 as a portion of providing 705 the housing body and/or forming 710, 715 the first opening and/or second openings.

In various embodiments, additional components may be provided 735. For example, a spring may be provided 735 to provide a forward biasing force, as described in greater detail herein. In another example, a ferrule flange tube may be provided 735 in the bore to provide a guide of the optical fibers, as described in greater detail herein.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A connector housing body comprising:
   a first opening formed in a first end of the housing body, wherein the first opening is configured to receive a terminating optical cable;
   a second opening formed in a second end of the housing body, wherein the second opening is configured to receive a fiber optic cable;
   a bore through the housing body extending from the first opening to the second opening; and
   a back post surrounding the second opening, wherein the back post extends from the second opening in a longitudinal direction and comprises a plurality of protrusions configured to reinforce a crimp sleeve, wherein a length of the back post has a concave shape defined by the plurality of protrusions, each protrusion having a top surface and a root surface, the top surfaces of the plurality of protrusions defining an outer contour having a top curvature radius and the root surfaces of the plurality of protrusions defining an inner contour having a root curvature radius.

2. The connector housing body of claim 1, wherein the connector housing body is a unitary structure comprised of a polymeric material.

3. The connector housing body of claim 1, wherein the crimp sleeve and at least one reinforcement fiber are affixed to the back post when a crimping pressure is applied to the crimp sleeve.

4. The connector housing body of claim 3, wherein the back post is configured to receive the crimp sleeve such that the crimp sleeve covers about ⅔ of the length of the back post.

5. The connector housing body of claim 3, wherein the concave shape of the back post is configured to provide a crimping area for the crimp sleeve such that the crimp sleeve and the at least one reinforcement fiber are affixed to the back post without damaging the connector housing.

6. The connector housing body of claim 1, wherein the concave shape of the back post causes a crimping sleeve, upon compression against the back post, to prevent removal of the fiber optic cable from the second opening.

7. The connector housing body of claim 1, wherein the concave shape of the back post causes a crimping sleeve, upon compression against the back post, to increase a pulling strength on the fiber optic cable.

8. The connector housing body of claim 1, wherein the first opening comprises a ferrule disposed within the first opening, wherein the ferrule is configured to securely receive the terminating optical cable.

9. The connector housing body of claim 8, further comprising a spring that is configured to provide a forward biasing force on the ferrule.

10. The connector housing body of claim 8, further comprising a flange disposed around the ferrule, wherein the flange is configured to provide a means for securing the terminating optical cable.

11. The connector housing body of claim 8, further comprising a ferrule flange tube disposed in the bore, wherein the ferrule flange tube is configured to guide an optical fiber portion of the fiber optic cable to the ferrule.

* * * * *